United States Patent
Haartsen

(10) Patent No.: US 8,018,885 B2
(45) Date of Patent: Sep. 13, 2011

(54) CODE KEYING IN A POWER SAVINGS MODE

(75) Inventor: Jacobus Cornelis Haartsen, Hardenberg (NL)

(73) Assignee: Sony Ericsson Mobile Communications AB, Lund (SE)

( * ) Notice: Subject to any disclaimer, the term of this patent is extended or adjusted under 35 U.S.C. 154(b) by 839 days.

(21) Appl. No.: 12/025,090

(22) Filed: Feb. 4, 2008

(65) Prior Publication Data

US 2009/0196209 A1    Aug. 6, 2009

(51) Int. Cl.
G08C 17/00     (2006.01)
H04J 3/06      (2006.01)

(52) U.S. Cl. .......................... 370/311; 370/509
(58) Field of Classification Search .......... 370/311
See application file for complete search history.

(56) References Cited

U.S. PATENT DOCUMENTS

| | | | |
|---|---|---|---|
| 2002/0136198 A1* | 9/2002 | Findikli | 370/350 |
| 2002/0174364 A1* | 11/2002 | Nordman et al. | 713/201 |
| 2004/0028083 A1* | 2/2004 | Billhartz et al. | 370/503 |
| 2004/0221046 A1* | 11/2004 | Heinonen et al. | 709/227 |
| 2005/0078614 A1* | 4/2005 | Haartsen | 370/260 |
| 2005/0156022 A1* | 7/2005 | Hepworth et al. | 235/375 |
| 2005/0169201 A1* | 8/2005 | Huylebroeck | 370/311 |
| 2006/0183423 A1* | 8/2006 | Johansson et al. | 455/41.2 |
| 2007/0147332 A1* | 6/2007 | Lappetelainen et al. | 370/346 |
| 2007/0162623 A1* | 7/2007 | Kondo | 710/2 |
| 2007/0287418 A1* | 12/2007 | Reddy | 455/410 |
| 2009/0180460 A1* | 7/2009 | Chang et al. | 370/345 |

FOREIGN PATENT DOCUMENTS

WO    WO 99/25051    5/1999

OTHER PUBLICATIONS

Ming, "Power Saving Mechanisms in Wireless Ad Hoc Networks", The Chinese University of Hong Kong, XP-002519655, Aug. 2005, p. 1-72.
Notification of Transmittal of the International Search Report and the Written Opinion of the International Searching Authority, or the Declaration corresponding to PCT/IB2008/053084, dated Apr. 22, 2009, 16 pages.

* cited by examiner

Primary Examiner — Andrew Chriss
(74) Attorney, Agent, or Firm — Snyder, Clark, Lesch & Chung, LLP

(57) ABSTRACT

A device may include logic to enter a power savings mode and wirelessly transmit a first synchronization packet to a remote device within a first transmission time slot in a first power savings cycle, the first synchronization packet including a code that is a member of a set consisting of a predetermined number of codes. In addition, the logic may be configured to sleep after transmitting the first synchronization packet to save energy, awake at a first receive time slot in the first power savings cycle, and receive a reply synchronization packet, the reply synchronization packet including a code is that is a member of the set from the remote device. The logic may be further configured to sleep until a start of a second power savings cycle that follows the first power savings cycle to save energy.

24 Claims, 15 Drawing Sheets

CODE KEYING IN A POWER SAVINGS MODE

BACKGROUND

Many of today's computing devices have the ability to communicate wirelessly with other devices. For example, a wireless keyboard or mouse may communicate with a laptop or a computer via radio frequency channels.

SUMMARY

According to one aspect, a device may include logic to enter a power savings mode and wirelessly transmit a first synchronization packet to a remote device within a first transmission time slot in a first power savings cycle, the first synchronization packet including a code that is a member of a set consisting of a predetermined number of codes. In addition, the logic may be configured to sleep after transmitting the first synchronization packet to save energy, awake at a first receive time slot in the first power savings cycle, and receive a reply synchronization packet, the reply synchronization packet including a code is that is a member of the set from the remote device. The logic may be further configured to sleep until a start of a second power savings cycle that follows the first power savings cycle to save energy.

Additionally, the code included in the first synchronization packet may be derived from an identity of the remote device to provide a signal for synchronizing the device and the remote device.

Additionally, the code included in the reply synchronization packet may be derived from an identity of the device, the code indicating the first synchronization packet has been received.

Additionally, the logic may be further configured to send a second synchronization packet in a second transmission time slot of the first power savings cycle that follows the first transmission time slot when a reply packet is not received in the first receive time slot.

Additionally, the first synchronization packet may consist of a device access code.

Additionally, the device access code may include a Bluetooth device address of the remote device.

Additionally, the first synchronization packet may include a header, data, and a channel access code to indicate that the packet includes the data.

Additionally, the logic may be further configured to send a second synchronization packet that includes a device access code to indicate that no additional data is waiting to be transmitted from the device.

Additionally, the logic may be further configured to send a second synchronization packet that includes one of a first code in the set to indicate that no additional data is waiting to be transmitted from the device, or a second code in the set to indicate that additional data is waiting to be transmitted from the device.

Additionally, the logic may be further configured to receive a second reply synchronization packet that includes one of a third code in the set, the third code indicating no additional data is waiting to be transmitted from the remote device, or a fourth code in the set, the fourth code indicating additional data is waiting to be transmitted from the remote device.

Additionally, the logic may be further configured to receive a second reply synchronization packet that includes one of the first code, which indicates that no additional data is waiting to be transmitted from the remote device, or the second code, which indicates that additional data is waiting to be transmitted from the remote device.

Additionally, the logic may be further configured to transmit a second synchronization packet to a second remote device in a power savings cycle of the second remote device.

Additionally, the power savings cycle of the second remote device may include an anchor point that is separated from an anchor point of the first power savings cycle by a predetermined number of synchronization attempts.

Additionally, the logic may be further configured to provide additional power to components of the logic for a particular amount of time prior to an arrival of the first receive time slot to enable the components to receive the reply synchronization packet.

Additionally, the logic may be further configured to compensate for a clock drift in the logic when the logic listens for a second synchronization packet from a master device.

Additionally, the logic may further include a code correlator that detects one of a device access code or a channel access code in the reply synchronization packet.

Additionally, the logic may include a Bluetooth controller.

Additionally, the power savings mode may be implemented in a sniff mode in Bluetooth.

Additionally, the device may include a cell-phone, a laptop, or a wireless computer peripheral.

According to another aspect, a method may include synchronizing a remote device with another device in at least one of a plurality of time frames. Synchronizing the remote device may include sending a synchronization packet within a transmit time slot in one of the time frames, the synchronization packet including a code that is member of a set consisting of a particular number of codes. Synchronizing the remote device may further include operating in a reduced power consumption state until a start of a receive time slot associated with the one of the time frames and determining whether a reply packet is received within the receive time slot, the reply packet including a code that is a member of the set. Further, synchronizing the remote device may include processing user data that is to be sent to or to be received from the remote device if the reply packet is received within the receive time slot.

Additionally, processing user data may include determining if user data is waiting to be exchanged, and at least one of sending another synchronization packet to the remote device when no user data is waiting to be exchanged, or exchanging the user data with the remote device when the user data is waiting to be exchanged.

Additionally, the method may further include determining if the one of the time frames is a last time frame of a power savings cycle when the reply packet is not received within the receive time slot.

Additionally, the method may further include operating in the reduced power consumption state until a next time frame arrives when the one of the time frames is the last time frame of the power savings cycle.

Additionally, the method may further include entering a sniff mode or exiting a sniff mode.

According to yet another aspect, a device may include means for wirelessly communicating a synchronization packet to a remote device within a time frame, the synchronization packet including a code that is a member of a set consisting of a particular number of codes. In addition, the device may include means for placing the means for wirelessly communicating in a reduced operating mode to save energy after communicating the synchronization packet, means for restoring the means for communicating to a full operating mode in the prescribed time frame, and means for receiving a reply synchronization packet from the remote device, the reply synchronization packet including a code that is a member of the set. Further, the device may include means for placing the means for receiving and the means for communicating in the reduced operating mode after receiving the reply synchronization packet.

According to a further aspect, a device may include a logic to wirelessly receive a first synchronization packet from a remote device within a first receive time slot in a first power savings cycle, the first synchronization packet including a code that is a member of a set consisting of a predetermined number of codes. In addition, the logic may be further configured to sleep after receiving the first synchronization packet to save energy, awake at a first transmission time slot in the first power savings cycle, transmit a reply synchronization packet, the reply synchronization packet including a code is that is a member of the set to the remote device, and sleep until a start of a second power savings cycle that follows the first power savings cycle to save energy.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF EMBODIMENTS

The following detailed description refers to the accompanying drawings. The same reference numbers in different drawings may identify the same or similar elements.

Overview

In implementations described herein, a device (e.g., a computer, a cell-phone, etc.) may be engaged in a wireless communication with a nearby device. When the devices exchange little data over the established communication link, each of the devices may enter a power savings mode. In the power savings mode, each of the devices may transmit and/or receive synchronization packets, also referred to herein as sync packets, over predetermined time intervals to remain synchronized to other devices. By limiting the size of the sync packets and restricting the time intervals over which the sync packets are transmitted and/or received, the devices may save additional power in the power savings mode. As used herein, the term "power saving mode" or "sleep mode" may refer to a device/component state in which the device or a component of the device reduces power expenditure. For example, if a transceiver of a device sleeps, the transceiver may be turned off. If the device/component "awakes," the device/component may return to a state in which device/component does not reduce the power expenditure.

Figure 1:
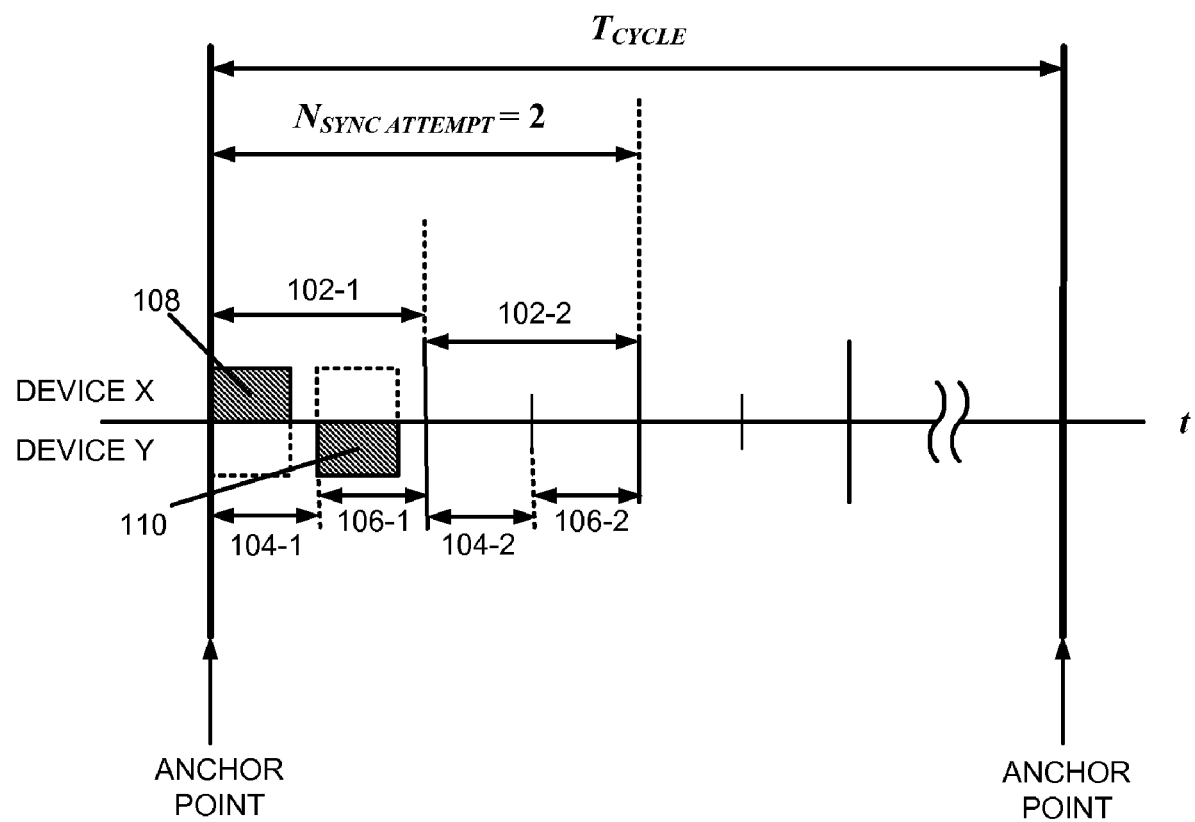
FIG. 1 is a timing diagram of exemplary signals that are generated by exemplary devices in which concepts described herein may be implemented.

The following example illustrates the above concept. FIG. 1 is a timing diagram of exemplary signals that are exchanged between device X and device Y during the power savings mode. A solid line box and dashed line box may represent, respectively, a transmission and reception of packet. As shown, each power savings cycle of duration $T_{CYCLE}$ may start and end at anchor points, and may include $N_{SYNC\ ATTEMPT}=2$ frames. $N_{SYNC\ ATTEMPT}$ may represent the number of attempts to synchronize device Y to device X in $T_{CYCLE}$. Frame 102-1 may include time slots 104-1 and 106-1, and frame 102-2 may include time slots 104-2 and 106-2.

In FIG. 1, device X may send a packet 108 in one of time slots 104-1 and 104-2, and device Y may send a reply sync packet 110 in one of time slots 106-1 and 106-2. By keeping the sync packets short, device X and device Y may reduce energy consumption during reception and transmission of signals in the power savings mode. In addition, by restricting the time slots in which device X and device Y may transmit and/or receive packets, device X and device Y may expend energy around specific time slots and reduce energy consumption during other time periods in $T_{CYCLE}$ (e.g., device X and device Y may power down their respective transceivers, etc. during the other time periods). Consequently, device X and device Y, may spend less energy over the entire $T_{CYCLE}$.

In contrast, in other existing systems or methods, a device may exchange sync packets that are very long. For example, in Bluetooth power savings mode (e.g., the Sniff mode), POLL and NULL packets may include bits that may not be needed for synchronizing devices. In addition, in other existing systems or methods, a device may listen for a sync packet during each of $N_{SYNC\ ATTEMPT}$ frames or greater number of frames. For example, in the Bluetooth Sniff mode, a device may be forced to listen to $N_{SYNC\ ATTEMPT}$ frames even if the sync packet is received in frame 102-1, where $N_{SYNC\ ATTEMPT}$ may be greater than one for robustness. This may set the device duty cycle at around 0.2%, when $N_{SYNC\ ATTEMPT}=4$.

Exemplary Network and Devices

Figure 2:
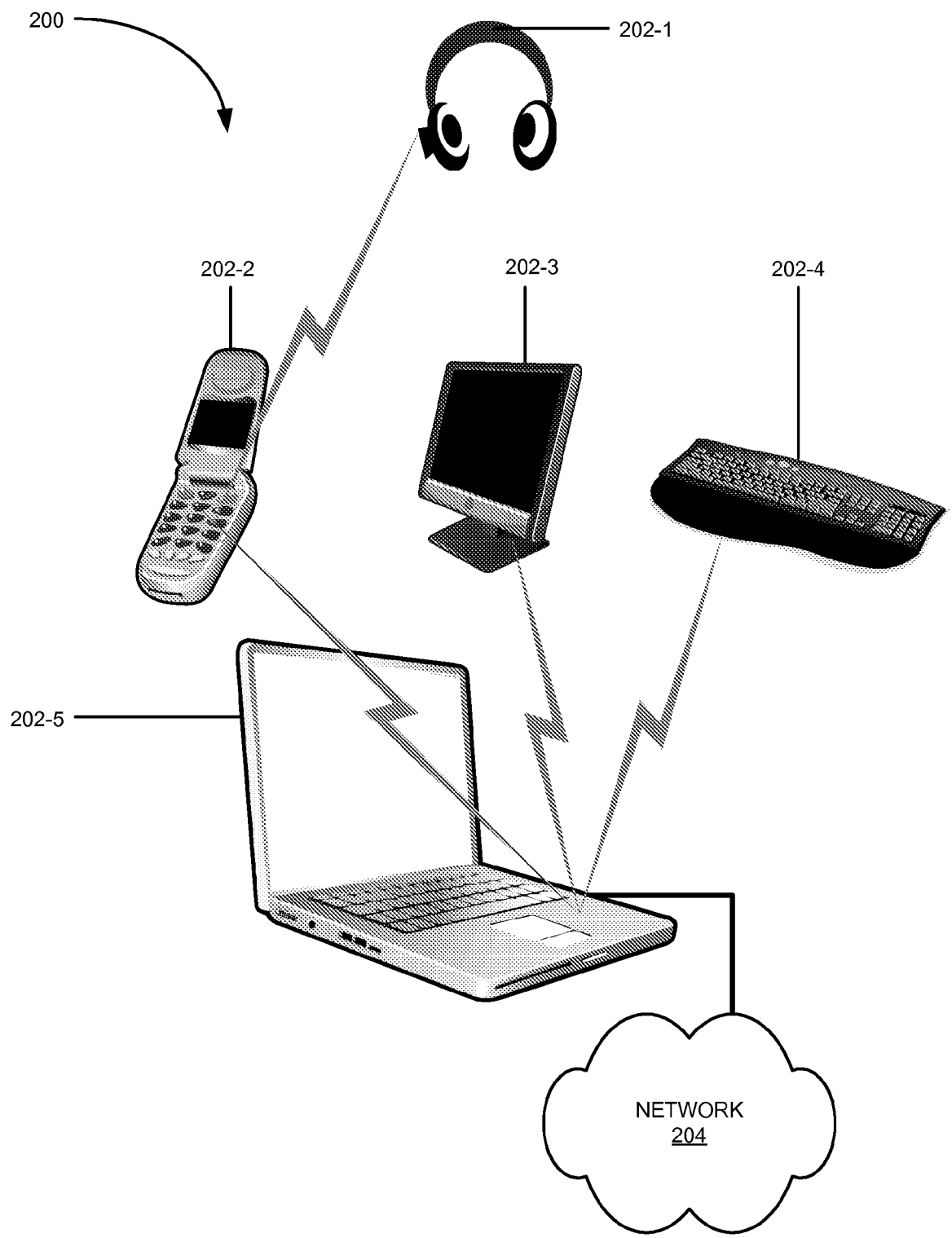
FIG. 2 shows an exemplary network that includes the exemplary devices.

FIG. 2 shows an exemplary network that includes exemplary devices in which concepts described herein may be implemented. As shown, network 200 may include devices 202-1 through 202-5 (herein collectively referred to as devices 202 and individually and generically as device 202-x) and a network 204. Depending on the implementation, network 200 may include fewer, additional, or different devices than the ones illustrated in FIG. 2. For example, network 200 may include a wireless access point (WAP) via which device 202-2 (e.g., a cell phone) may communicate with another device in network 204.

Devices 202 may include any of the following devices that have the ability to or are adapted to communicate wirelessly via, e.g., Bluetooth, Wireless Fidelity (Wi-Fi), near-field communication (NFC), etc., with other devices in close proximity: a telephone, such as a radio telephone or a mobile telephone; a personal communications system (PCS) terminal that may combine a cellular radiotelephone with data processing, facsimile, and/or data communications capabilities; an electronic notepad; a laptop; a personal computer (PC); computer peripherals such as a keyboard, a mouse, speakers, etc.; a personal digital assistant (PDA) that can include a telephone; or another type of computational or communication device. In the following paragraphs, while devices 202 may be implemented as different types of devices that are capable of communication in close proximity, devices 202 will be described in terms of Bluetooth devices (e.g., host to a Bluetooth component) that are participating in a wireless network, such as a wireless personal area network (WPAN).

Network 204 may include the Internet, an ad hoc network, a local area network (LAN), a wide area network (WAN), a metropolitan area network (MAN), a cellular network, a public switched telephone network (PSTN), an intranet, any other network, or a combination of networks.

In some implementations, devices 202 in network 200 may communicate with one another based on Bluetooth communication technology. To establish a connection, a sender (e.g., a master device) and a recipient (e.g., a slave device) may be synchronized in both time and frequency. For connection establishment, a paging procedure may be used, in which the sender may send a short identification (ID) packet on many different frequencies. The recipient may apply a low duty cycle scanning. For example, the recipient may scan a single frequency for about 10 milliseconds (ms) every second. For each new scan, a new hop frequency may be selected. Such frequency hopping (FH) may provide robustness in a multi-path fading and interference-prone environment.

In a Bluetooth system, the initial synchronization may incur a delay (typically 1-2 seconds in an error-free environment, but longer in an error-prone environment) that translates to extra power consumption at the sender (pager) and the recipient (scanner). Therefore, once synchronized, from a power perspective, it may be advantageous to maintain the synchronization between devices 202 even if devices 202 have no immediate data to exchange with one another.

In the Bluetooth system, the synchronization may be maintained in a power savings mode by participating devices in a WPAN. For example, once devices 202 are in the power savings mode (e.g., Bluetooth Sniff mode), device 202-*x* that is acting as a slave device (e.g., device 202-1, 202-3, 202-4, or 202-5) may wake up for a short time period in certain time intervals. During this period, device 202-*x* (e.g., device 202-2 or device 202-6) that is acting as a master device may send a sync packet. This packet may be used by the slave device to re-synchronize its signals with the master device.

Figure 3:
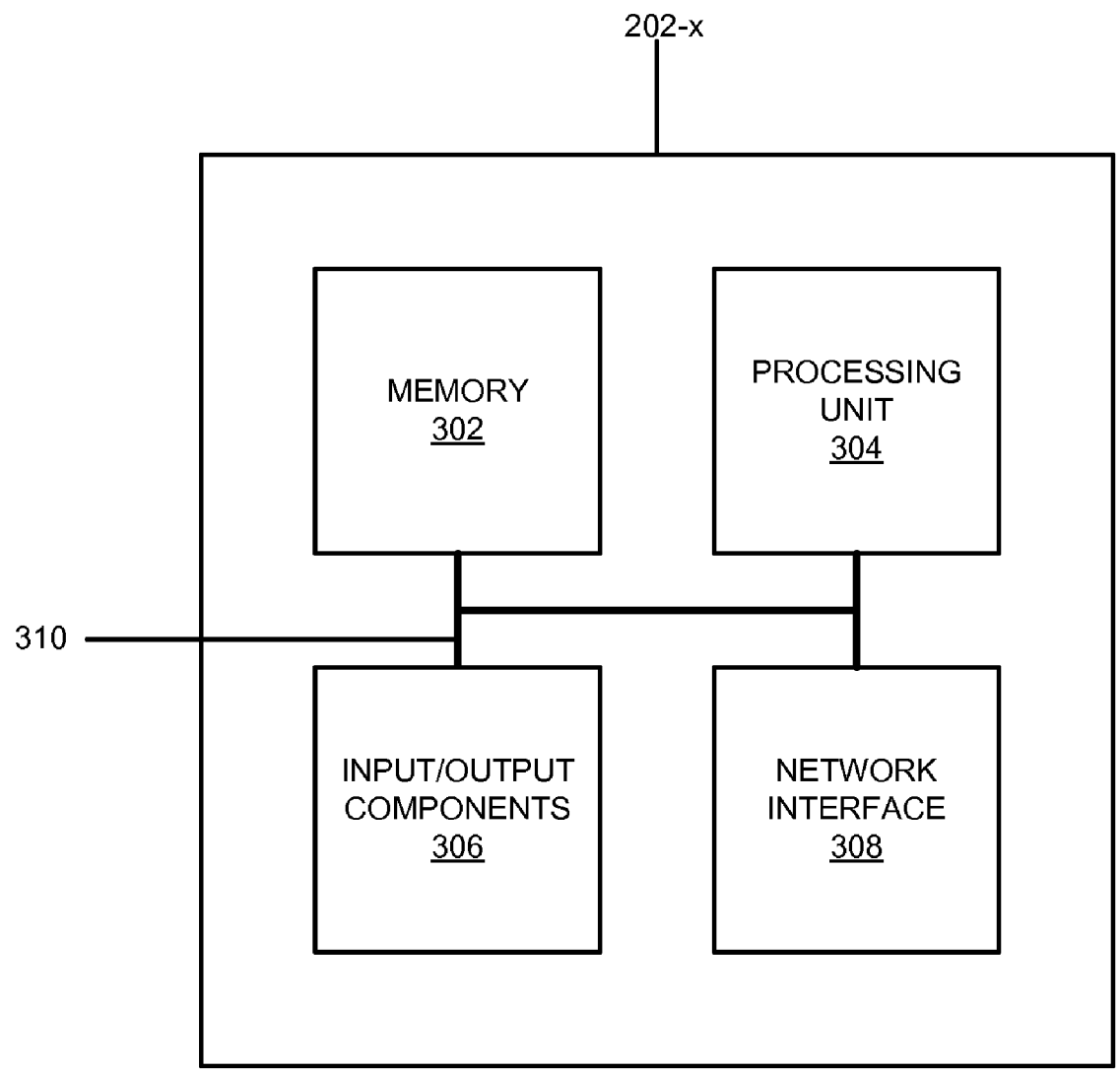
FIG. 3 is a block diagram of exemplary components of an exemplary device of FIG. 2.

FIG. 3 is a block diagram of exemplary components of exemplary device 202-*x*. The term "component," as used herein, may refer to hardware component, a software component, or a combination of the two. As shown, device 202-*x* may include memory 302, processing unit 304, input/output (I/O) components 306, network interface 308, and bus 310 In other implementations, device 202-*x* may include additional, fewer, or different components those illustrated in FIG. 3.

Memory 302 may include static memory, such as read only memory (ROM), and/or dynamic memory, such as random access memory (RAM), or onboard cache, for storing data and machine-readable instructions. Memory 302 may also include storage devices, such as a floppy disk, CD ROM, CD read/write (R/W) disc, and/or flash memory, as well as other types of storage devices. Processing unit 304 may include a processor, a microprocessor, an Application Specific Integrated Circuit (ASIC), a Field Programmable Gate Array (FPGA), and/or other processing logic capable of controlling device 202-*x*.

Input/output components 306 may include a display (e.g., liquid crystal display (LCD), a cathode ray tube (CRT), etc.), a keyboard, a keypad, a button, a mouse, a speaker, a microphone, a Digital Video Disk (DVD) writer, a DVD reader, Universal Serial Bus (USB) lines, and/or other types of devices for converting physical events or phenomena to and/or from digital signals that pertain to device 202-*x*.

Network interface 308 may include any transceiver-like mechanism that enables device 202-*x* to communicate with other devices and/or systems. For example, network interface 308 may include mechanisms for communicating via a network, such as the Internet, a terrestrial wireless network (e.g., wireless local area network (WLAN)), a satellite-based network, etc. Additionally or alternatively, network interface 308 may include a modem, an Ethernet interface to a local area network (LAN), and/or an interface/connection for connecting device 202-*x* to other devices. In one implementation, network interface 308 may include a Bluetooth component (e.g., a Bluetooth controller).

Bus 310 may provide an interface through which components of device 202-*x* can communicate with one another.

Figure 4:
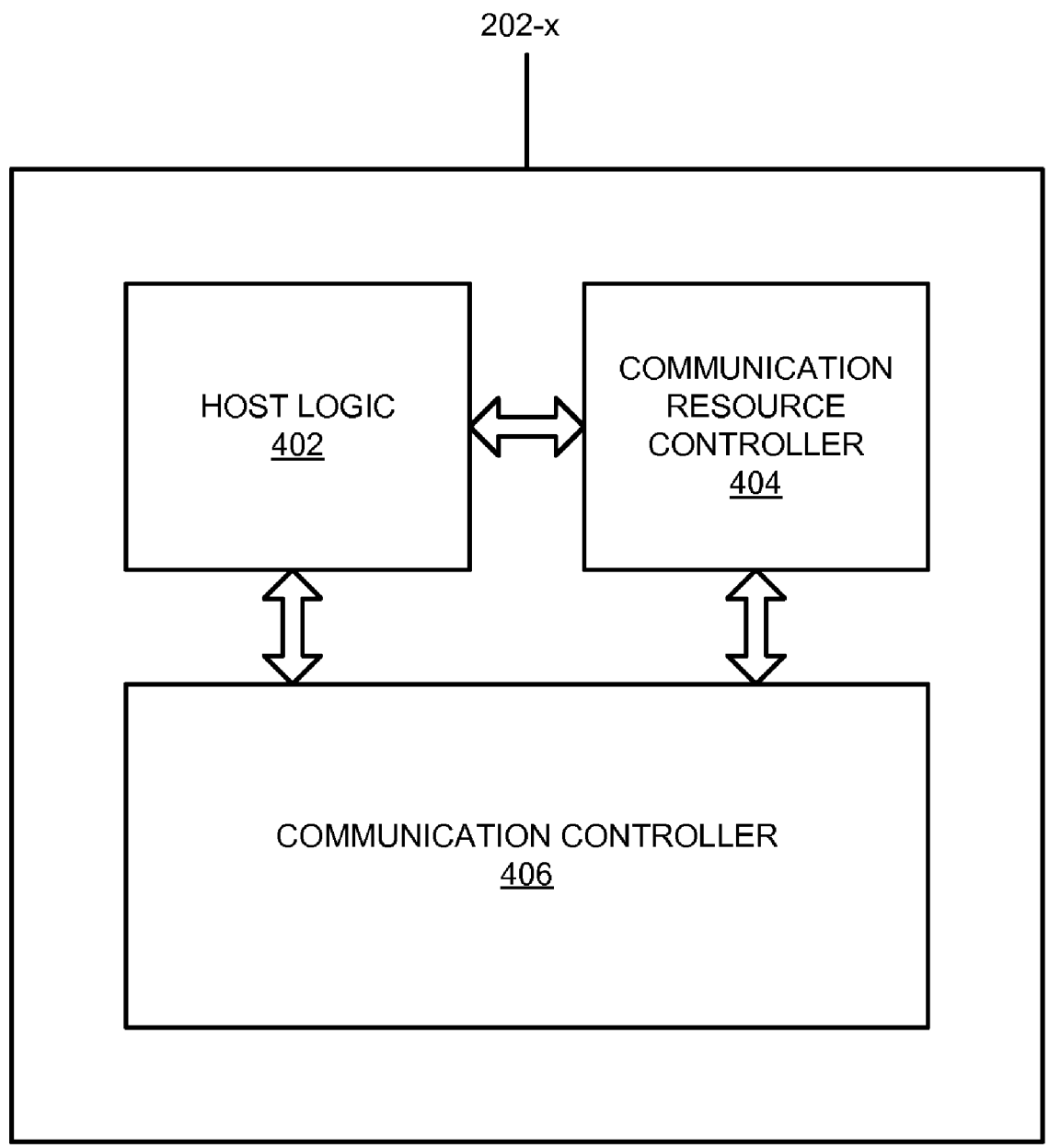
FIG. 4 is a functional block diagram of the exemplary device of FIG. 3.

FIG. 4 is a functional block diagram of device 202-*x*. As shown, device 202-*x* may include host logic 402, a communication resource controller 404, and a communication controller 406. In one implementation, host logic 402, communication resource controller 404, and communication controller 406 may be implemented by, for example, processing unit 304, or alternatively, via plug-in components. In addition, depending on the particular implementation, device 202-*x* may include fewer, additional, or different types of functional blocks than those illustrated in FIG. 4.

Host logic 402 may include hardware and/or software for providing functionalities of device 202-*x*. For example, host logic 402 may provide email services, a browser, a telnet client, a file transfer protocol client, phone services, etc. In providing the functionalities, host logic 402 may interact with communication resource controller 404 and communication controller 406.

Communication resource controller 404 may include hardware and/or software for creating, managing, and/or removing communication channels (e.g., a Logical Link Control and Adaptation Protocol (L2CAP) Resource Manager in a Bluetooth Core system, a Channel Manager in the Bluetooth Core system, etc.). In addition, communication resource controller 404 may organize submission of data unit fragments to baseband components and may ensure that underlying physical channels can be accessed to provide for quality of service (QoS) commitments.

Communication controller 406 may include components for controlling communication links via lower layers of communication (e.g., physical communication link, logical link, etc.). One example of communication controller 406 may include a Bluetooth controller.

Figure 5:
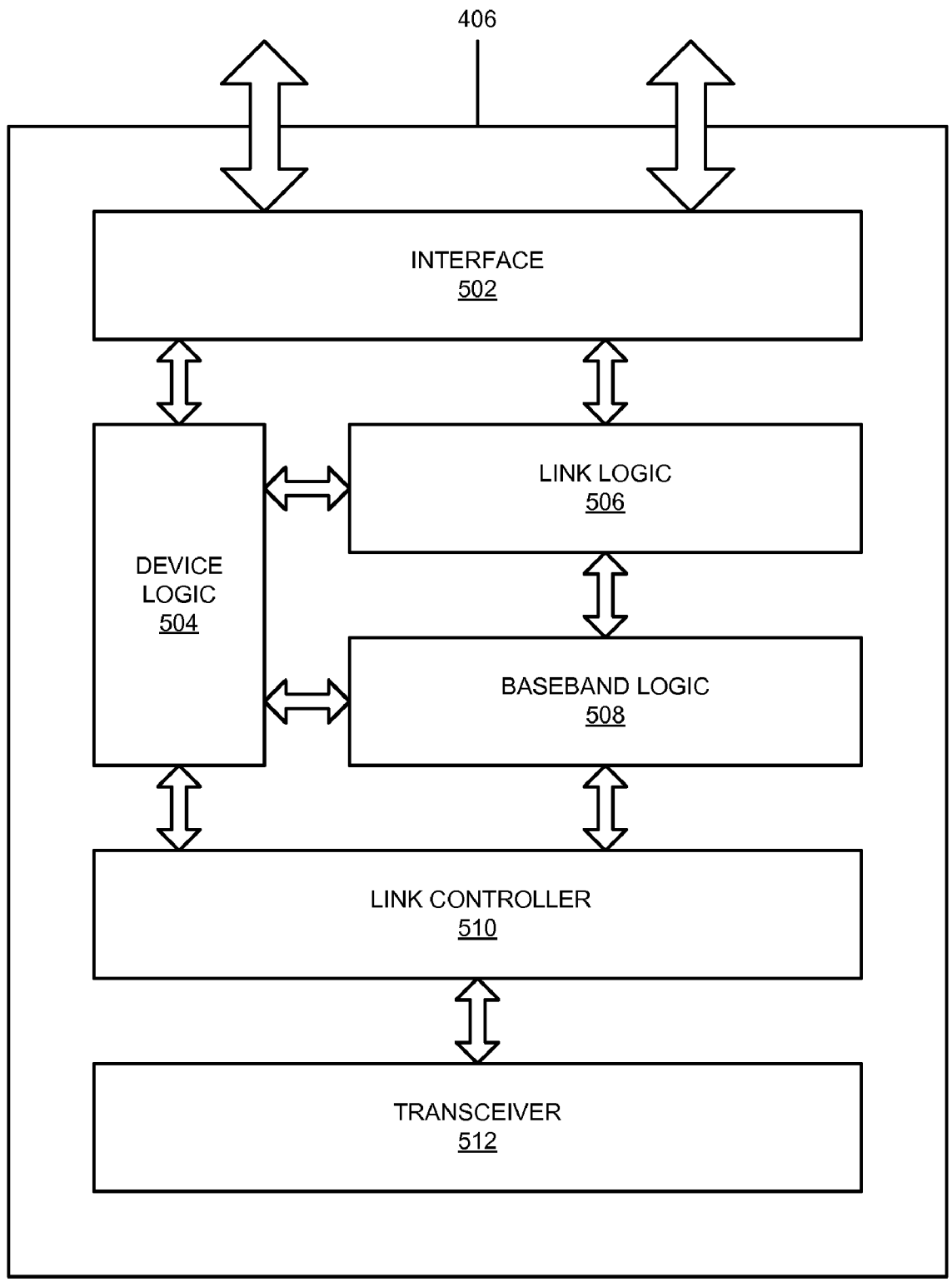
FIG. 5 is a functional block diagram of an exemplary communication controller of FIG. 4.

FIG. 5 is a block diagram of communication controller 406. As shown, communication controller 406 may include an interface 502, device logic 504, link logic 506, baseband logic 508, a link controller 510, and transceiver 512. Depending on implementations, communication controller 406 may include fewer, additional, or different components than those illustrated in FIG. 5.

Interface 502 may provide a command interface between host logic 402 and device logic 504 and/or link logic 506. Host logic 402 may direct the behavior of communication controller 406 via interface 502. Device logic 504 may include hardware and/or software for controlling the general operations of device 202-x. The operations may be related to a set of specific communication functions, such as detecting other remote devices that share the same communication channels/protocols, connecting to the remote devices, etc. Link logic 506 may include hardware and/or software for creating, changing, and/or releasing logical links/transports by communicating with other link logic in remote devices. Baseband logic 508 may include hardware and/or software for negotiating a QoS and scheduling time on physical channels for components that request communication services.

Link controller 510 may encode and/or decode packets to/from data payload based on parameters that are associated with physical channels and logical links/transport. In one implementation, link controller 510 may include a code correlator (not shown in FIG. 5) to identify sync packets.

Transceiver 512 may include components for transmitting and receiving packets on physical channels.

Figure 6:
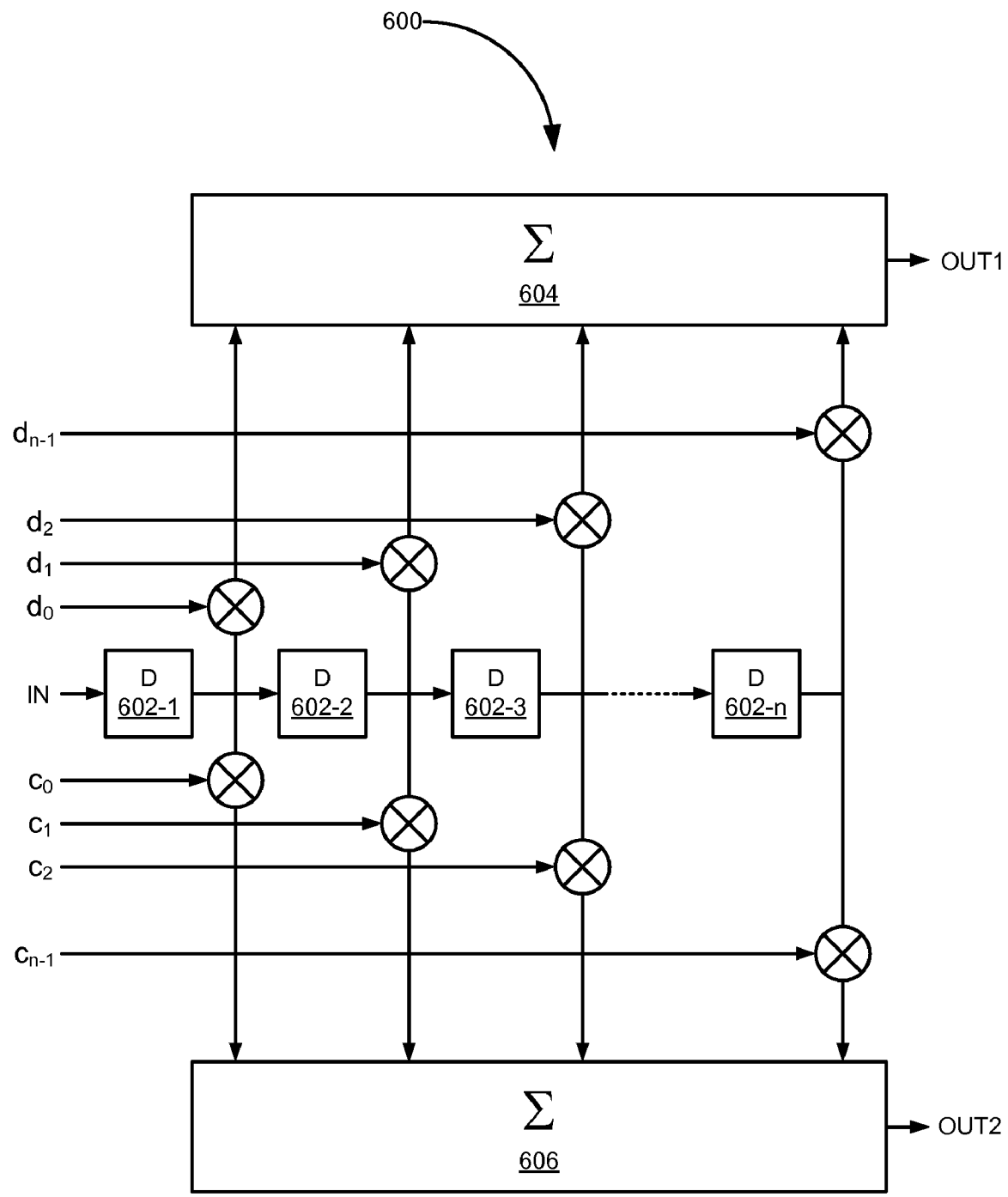
FIG. 6 is a functional block diagram of a code correlator.

FIG. 6 is a functional block diagram of a code correlator 600 in link controller 510. Code correlator 600 may determine whether a received packet is a sync packet, which may be one of two types. Each type of sync packet may be distinguished from the other based on whether the sync packet carries code D, with bit pattern $d_0, d_1, d_2, \ldots$ and $d_{n-2}$, or code C, with bit pattern $c_0, c_1, c_2, \ldots,$ and $c_{n-1}$. In the power savings mode, code D may be transmitted by a device for purely synchronization purposes, and code C may be transmitted by the device to indicate that data is waiting to be conveyed.

As shown, code correlator 600 may include delays 602-1 through 602-n (herein individually referred to as delays 602 and individually and generically as delay 602-x), an adder 604, and an adder 606. Depending on implementation, code correlator 600 may include additional, fewer, or different components than those shown in FIG. 6.

Each of delays 602 may provide a delayed version of bit values of a received packet. Furthermore, the delayed bit values may be multiplied by coefficients which represent specific bit values that are to be detected. In FIG. 6, the coefficients may include $d_0, d_1, d_2, \ldots$ and $d_{n-1}$. The results of the multiplications may be summed by adder 604 to produce an output value OUT1. The magnitude of OUT1 may indicate whether a bit sequence that matches the coefficient is present in the packet, and therefore, may identify a sync packet that carries the bit sequence $d_0, d_1, d_2, \ldots$ and $d_{n-1}$ (i.e., code D).

Similarly, the delayed bit values may be multiplied by coefficients $c_0, c_1, c_2, \ldots,$ and $c_{n-1}$, and summed by adder 606 to produce an output value OUT2. The magnitude of OUT2 may indicate whether a bit sequence that matches the coefficients is present in the packet, and therefore, may identify a sync packet that carries the bit sequence $c_0, c_1, c_2, \ldots,$ and $c_{n-1}$, (i.e., code C).

In Bluetooth implementations, code C and code D may be derived from Bluetooth Device addresses (BD_ADDRs). More specifically, BD_ADDR of a slave device may be used as code D to indicate that synchronization is taking place without any waiting data, and BD_ADDR of a master device may be sent as code C to indicate that data is waiting to be exchanged. BD_ADDR of the slave device (code D) and BD_ADDR of the master device (code C) may be referred to as Device Access Code (DAC) and Channel Access Code (CAC), respectively.

Figure 7A:
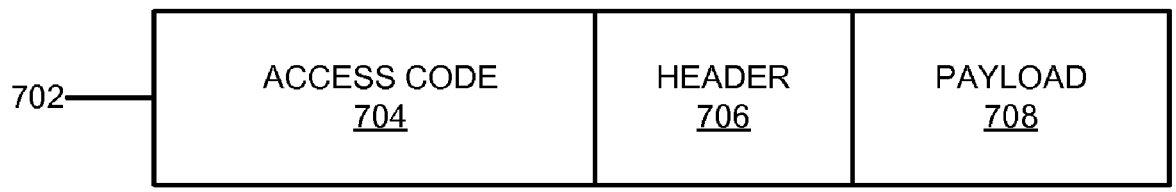
FIG. 7A is a block diagram of an exemplary packet that may be exchanged between exemplary devices in the exemplary network of FIG. 2.

FIG. 7A is a block diagram of an exemplary packet 702 in network 200. As shown, packet 702 may include an access code 704, a header 706, and a payload 708. Access code 704 may include a pseudo-random bit sequence with good auto-correlation and cross-correlation properties that allow a receiver to accurately synchronize to a sender in time and frequency. Because code correlator 600 is used in communication controller 406, direct-sequence processing gain may be obtained for access code 704, and, therefore, may endow access code 704 with extra robustness. Header 706 may include encoded link control information. In one implementation, the information in header 706 may include address, packet type (e.g., POLL or NULL packet in Bluetooth), flow control flag (e.g., whether a receiving device is to stop transmitting), packet sequence number, and/or a checksum. Payload 708 may include data to/from device 202-x.

Figure 7B:
FIG. 7B is a block diagram of an exemplary sync packet.

For the purposes of maintaining device 202-x synchronized to other devices in the power savings mode, a short version of packet 702 may be used as a sync packet. FIG. 7B is a block diagram of an exemplary sync packet 710. As shown, sync packet 710 may include access code 712 and may exclude header 706 and payload 708.

Access code 712 in packet 710 may also be shorter than access code 704. For example, in Bluetooth communication, packet 710 may take the form of an ID packet (the shortest packet used in Bluetooth), which is 68 bits in length. In contrast, access code 704 for a full packet 702 in Bluetooth may be longer than 68 bits. The additional bits in access code 704 may pertain to bits that follow access code 704, and may not be used in implementations described herein.

In the power savings mode, sync packet 710, depending on a bit sequence of access code 712, may indicate whether user data is waiting in sender queues and further communication during $T_{CYCLE}$ may be needed. That is, code keying may be used during the power savings mode. For pure synchronization purposes, one code (e.g., code D) may be used, and for signaling purposes, two codes may be used (e.g., code C and code D). For example, if user data is waiting at device 202-x, sync packet 710 may carry access code C with bit sequence $c_0, c_1, c_2, \ldots,$ and $c_{n-1}$, and if there is no waiting user data, sync packet 710 may carry another access code D with bit sequence $d_0, d_1, d_2, \ldots$ and $d_{n-1}$. As already explained above, code correlator 600 in link controller 510 may determine whether a sync packet carries code C or code D.

In Bluetooth implementations, access code 712 may be derived from Bluetooth Device addresses (BD_ADDRs). More specifically, BD_ADDR of a slave device may be used by either the slave device or the master device as access code 712 to indicate that synchronization is taking place without any waiting data, and BD_ADDR of a master device may be sent as access code 712 by either the slave device or the master device to indicate that data is waiting to be exchanged. BD_ADDR of the slave device and BD_ADDR of the master device may be referred to as Device Access Code (DAC) and Channel Access Code (CAC), respectively.

Exemplary Process for Using a Background Image

Figure 8:
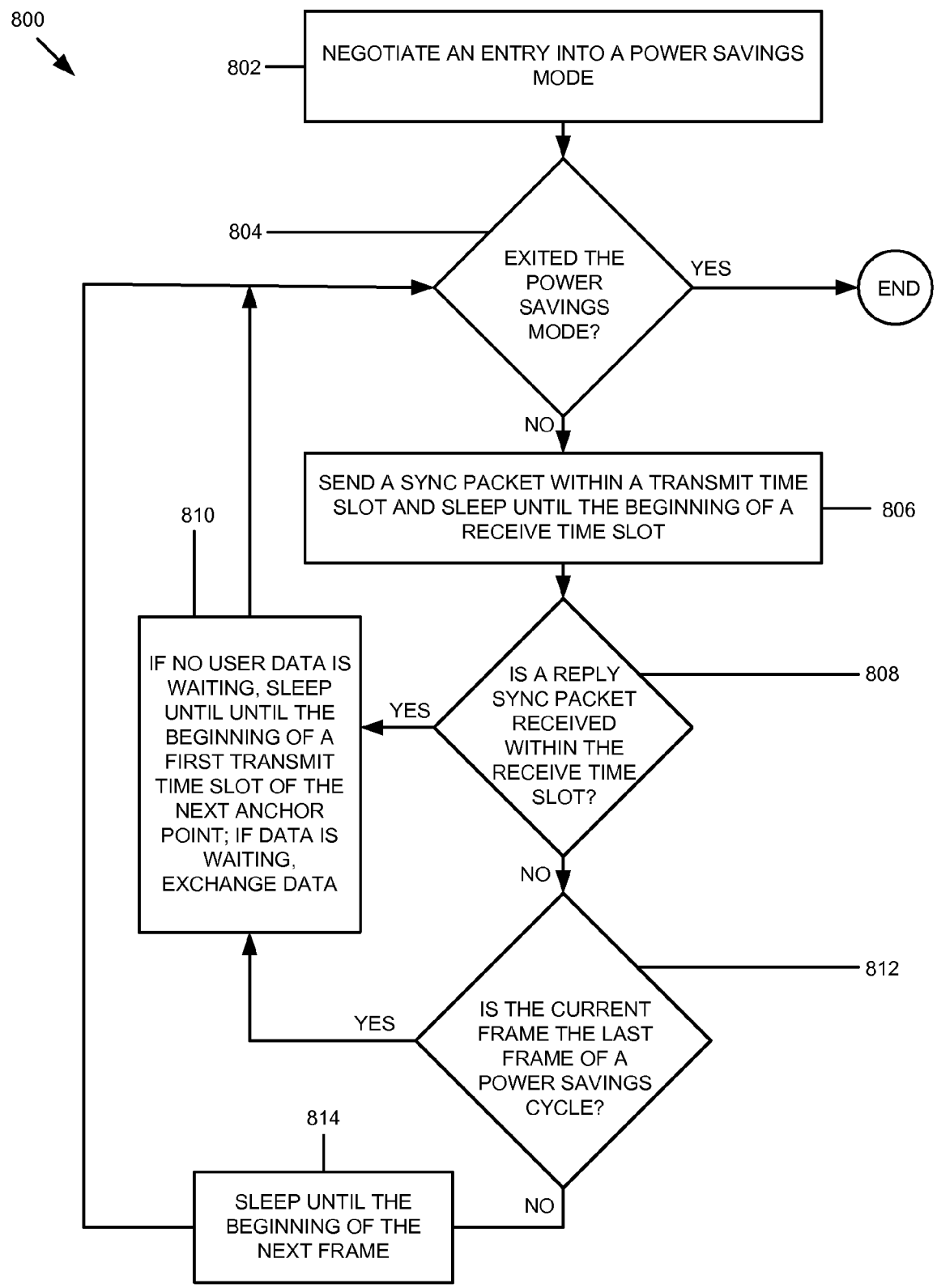
FIG. 8 is a flowchart of an exemplary process for code keying in a power savings mode.

FIG. 8 is a flowchart 800 of an exemplary process for code keying in a power savings mode. Assume that device 202-x has established a connection with another device 202-y (e.g., a generic device). Process 800 may start at block 802, where device 202-x may negotiate an entry into the power savings mode with device 202-y. The negotiation may involve exchanging messages. For example, in a Bluetooth communication, devices 202-x and 202-y may exchange a number of messages to set parameters that are related to the Sniff mode (e.g., a power savings mode in the Bluetooth protocol).

Device 202-x may determine if device 202-x has exited from the power savings mode (block 804). In some implementations, network interface 308 of device 202-x may determine if device 202-*x* or a component of device 202-*x* (e.g., network interface 308) has exited from the power savings mode. Device 202-*x* and other devices (e.g. device 202-1) with which device 202-*x* is synchronized may exit the power savings mode, for example, when the user turns on music on device 202-*x*, causes an exchange of messages between devices 202-*x* and 202-*y*, etc. If device 202-*x* is still in the power savings mode, process 800 may proceed to block 806. Otherwise, process 800 may terminate.

Device 202-*x* may send a sync packet within a transmit time slot and then sleep until device 202-*x* encounters a receive time slot (block 806). For example, referring back to FIG. 1, device 202-*x* may send the sync packet within transmit time slot 104-1 and then sleep until the beginning of time slot 106-1.

Device 202-*x* may determine if a reply sync packet is received within the receive time slot (block 808). If the reply sync packet is not received within the receive time slot, process 800 may proceed to block 810; otherwise, process 800 may proceed to block 812.

At block 810, if no user data is waiting at device 202-*x*, device 202-*x* may sleep until near the beginning of a first transmit time slot of the next anchor point (block 810). The term "anchor point," as used herein, may refer to the beginning of a power savings cycle. In addition, the duration of the power savings cycle, $T_{CYCLE}$, and the various transmit and receive time slots in $T_{CYCLE}$ may be predetermined, and may be stored in memory of device 202-*x*. At the beginning of the first transmit time, process 800 may return to block 804, to continue with the power savings cycles.

At block 810, if user data is waiting either at device 202-*x* or at device 202-*y*, devices 202-*x* and device 202-*y* may exchange data.

Figure 9A:
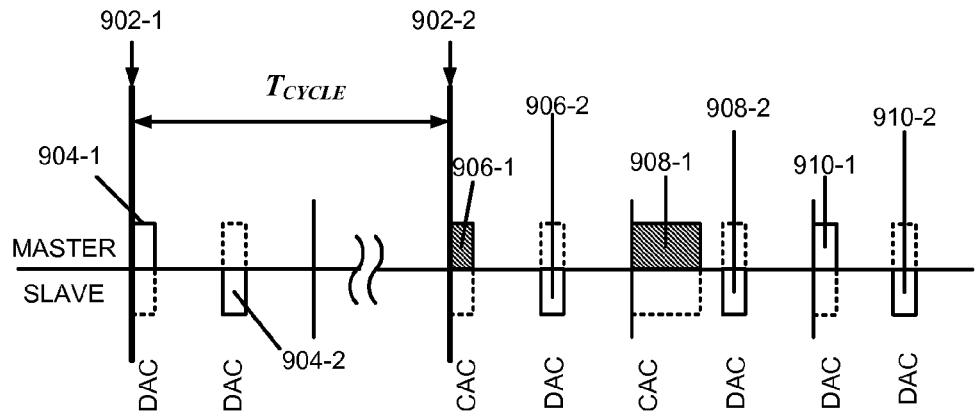
FIGS. 9A and 9B are timing diagrams of exemplary signals that are generated by the exemplary devices of FIG. 2.
Figure 9B:
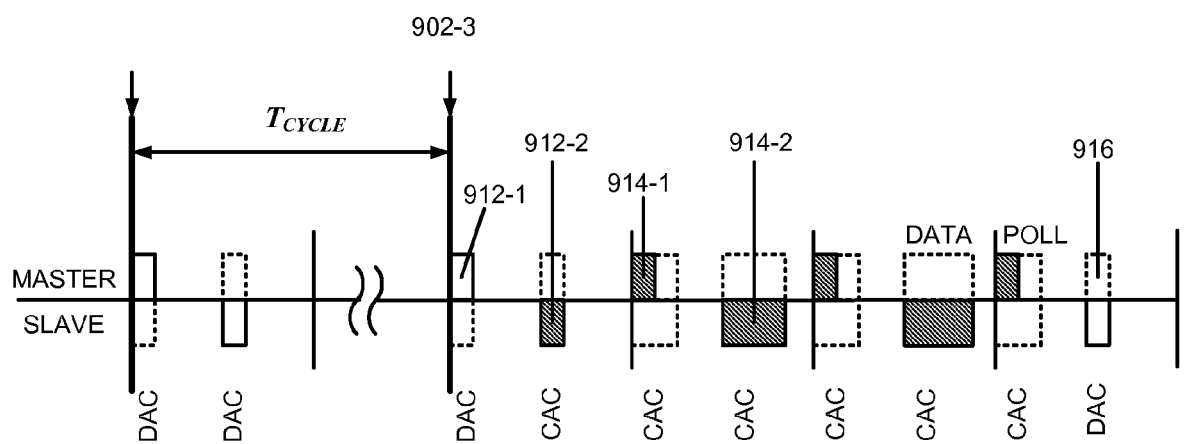

FIGS. 9A and 9B are timing diagrams of exemplary signals that are generated by devices 202-*x* and 202-*y* when the user data is exchanged between device 202-*x* and 202-*y*. In FIGS. 9A and 9B, devices 202-*x* and 202-*y* may act as a master device and a slave device respectively.

FIG. 9A shows device 202-*x* sending data to device 202-*y*. As shown, device 202-*x* and 202-*y* may exchange DAC 904-1 and DAC 904-2 between anchor points 902-1 and 902-2. As shown, device 202-*x* (e.g., a master device) may send DAC 904-1 to allow device 202-*y* to be synchronized to device 202-*x* and to indicate that device 202-*x* has no additional data to send, and device 202-*y* (e.g., a slave device) may send DAC 904-2 to acknowledge the receipt of DAC 904-1 and to indicate that device 202-*y* has no additional data for transmission. DAC 904-*x* may include the access code of slave device 202-*y*.

After anchor point 902-2, device 202-*x* may send CAC 906-1, which includes the access code of device 202-*x*, to indicate that there is user data waiting to be transmitted from device 202-*x*. Device 202-*y* may respond with DAC 906-2, to acknowledge the reception of DAC 906-1 and to indicate that device 202-*y* has no data for transmission.

In the following time slot, device 202-*x* may send data 908-1, to which device 202-*y* may respond with DAC 908-2, indicating the reception of data 908-1 and that there is no data waiting to be sent. In the following slots, device 202-*x* may send DAC 910-1 to indicate that there is no more data waiting to be sent, and device 202-*y* may acknowledge the reception of DAC 910-1 with DAC 910-2.

FIG. 9B shows device 202-*x* receiving data from device 202-*y*. As shown, after receiving synchronizing signal DAC 912-1 from device 202-*x*, device 202-*y* may respond with CAC 912-2 that indicates DAC 912-1 is received and that data is waiting to be sent from device 202-*y*. Device 202-*x* may send POLL packet 914-1 to indicate that it is ready to receive data, and device 202-*y* may send data packet 914-2 in response to POLL packet 914-1. Device 202-*x* and device 202-*y* may continue to exchange data, until device 202-*y* indicates that there is no more data to be sent, by sending DAC 916.

In a different embodiment, it may be possible for device 202-*x* or 202-*y* to signal in the last data packet that no more data follows, by including the DAC of the slave device (e.g., device 202-*y*) in the header of the last data packet. In FIG. 9A, this means that device 202-*y* may not need to listen for additional sync packets after DAC 908-2 is sent to device 202-*x*. In FIG. 9B, this means that device 202-*x* may not need to send the last POLL packet (e.g., the packet that immediately precedes DAC 916) since master device 2-2-*x* will receive the DAC of slave device 202-*y* in the last transmission that includes data.

Figure 10A:
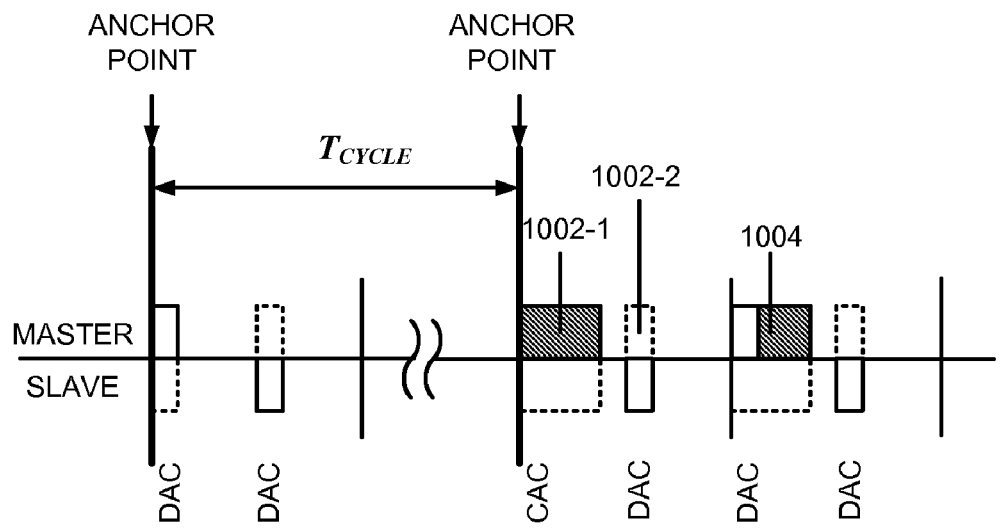
FIGS. 10A and 10B are additional timing diagrams of exemplary signals that are generated by the exemplary devices of FIG. 2.
Figure 10B:
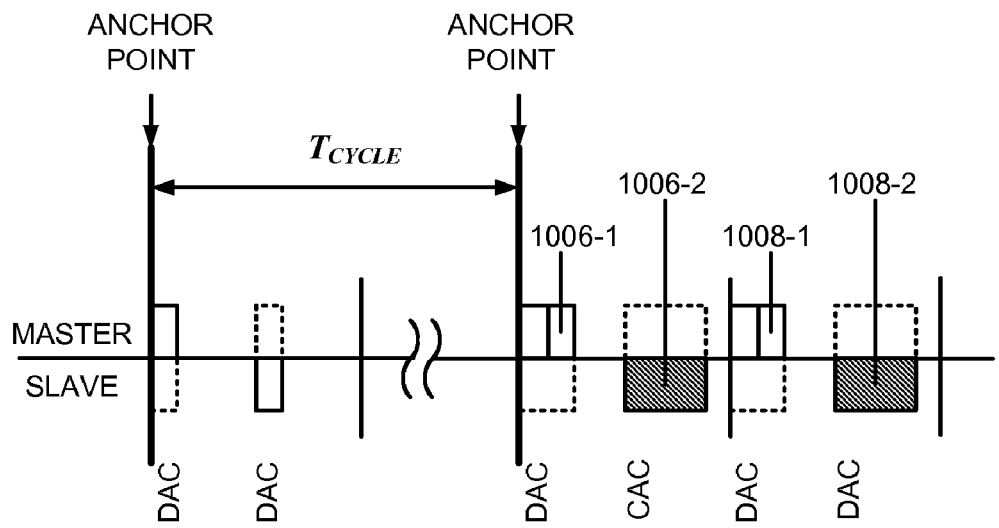

FIGS. 10A and 10B are timing diagrams of exemplary signals that are generated by devices 202-*x* and 202-*y* in an alternative implementation when the user data is exchanged between device 202-*x* and 202-*y*. In FIGS. 10A and 10B, a synchronization signal (e.g., access code) and a payload may be sent in a single packet under specific situations.

FIG. 10A shows data packet 1002-1 from device 202-*x*. Data packet 1002-1 may incorporate both a CAC and a payload. Device 202-*y* may respond to data packet 1002-1 with DAC 1002-2. The next data packet 1004 may carry not only data, but may also indicate that there may be no additional following data packets, by incorporating DAC in its header.

FIG. 10B shows POLL packets 1006-1 and 1008-1 from device 202-*x* and data packets 1006-2 and 1008-2 from device 202-*y*. DACs in POLL packets 1006-1 and 1008-1 may indicate that no data is pending in device 202-*x*. In addition, the DAC in last data packet 1008-2 may indicate that no additional data is pending in device 202-*y*.

Returning to FIG. 8, at block 812, device 202-*x* may determine whether the current frame is the last frame of a power savings cycle (block 812). As shown in FIG. 1, a power savings cycle of length $T_{CYCLE}$ may include $N_{SYNC\ ATTEMPT}$ frames. Thus, for example, when device 202-*x* has not received a sync packet in time slot 106-1, device 202-*x* may determine if frame 102-1 (e.g., the current frame) is the last frame within the power savings cycle. The determination may be based on pre-set duration $T_{CYCLE}$. As discussed previously, devices 202 may store the value of $T_{CYCLE}$ in their respective memories 302. If the current frame is the last frame of the power savings cycle, process 800 may proceed to block 810; otherwise, process may proceed to block 814.

Device 202-*x* may sleep until the beginning of the next frame (block 814). At the beginning of the next frame, process 800 may return to block 804.

In the above implementations, by limiting the size of packets and by restricting the time intervals (e.g., slots) over which the sync packets are transmitted and/or received, devices 202-*x* and 202-*y* may save additional power in the power savings mode by, for example, powering down certain components (e.g., transceiver 512) during periods in which sync packets may not be transmitted/received. These time slots/durations may be pre-stored in memory 302 of each of devices 202. Furthermore, in order to shorten the packets and still permit devices 202-*x* and device 202-*y* to exchange data, code keying is used (e.g., using code C and code D to synchronize and/or to exchange data).

Figure 11A:
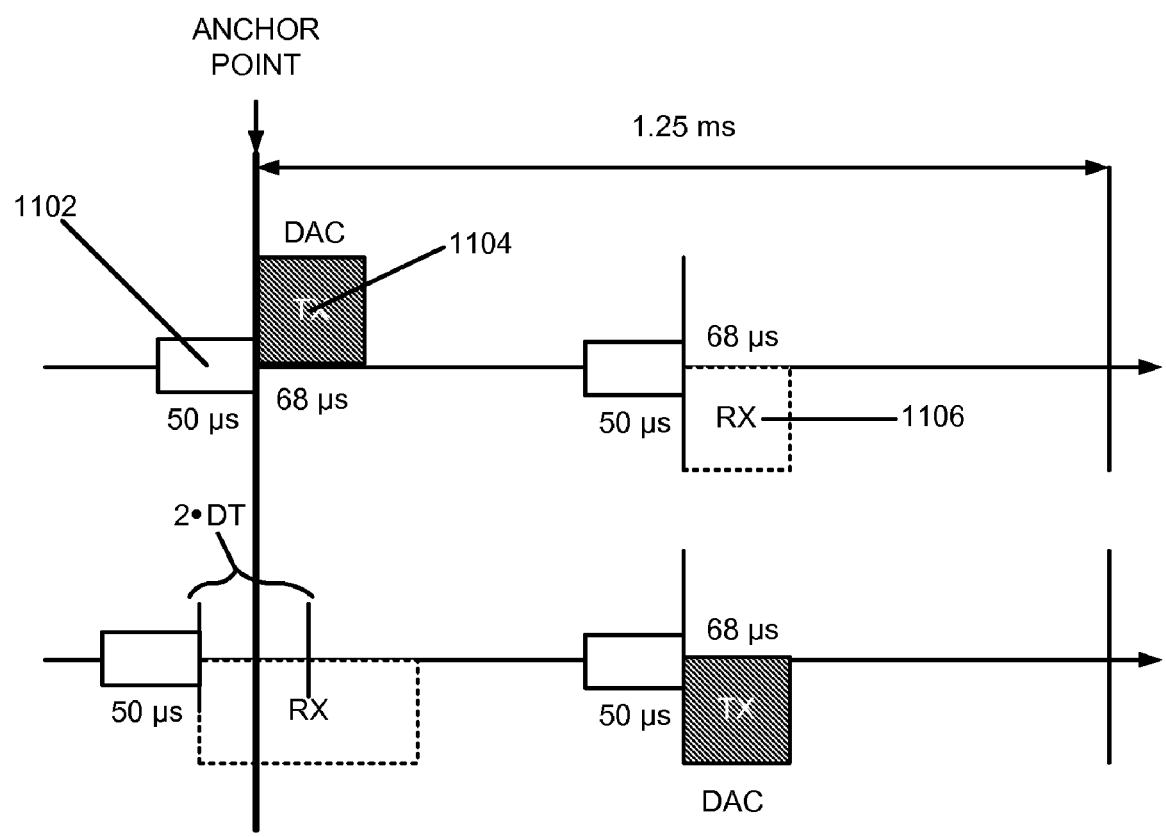
FIG. 11A shows detailed timing diagrams of exemplary signals that are generated by the exemplary devices of FIG. 2.

The additional power savings may be approximated by obtaining the duty cycles for device 202-*x* and 202-*y*. For example, FIG. 11A shows detailed timing diagrams of exemplary signals that are generated by devices 202-*x* and 202-*y* when devices 202-x and 202-y are implemented in accordance with Bluetooth specifications. In contrast to FIGS. 1, 9A, 9B, 10A, and 10B, FIG. 11A shows transmission/reception of packets for device 202-x and device 202-y in two separate timing diagrams. In FIG. 11A, assume that each bit in sync packets is 1 microsecond (μs) in duration, that a frame is 1.25 microseconds long, and that transceiver 512 in devices 202-x and 202-y may require 50 μs-long window 1102 to stabilize before sending/transmitting sync packets (e.g., power up components in device 202-x such that they begin to exit the powers savings/sleep mode).

The amount of time for which device 202-x is awake to transmit a DAC 1104 may be given by: 68 μs (e.g., the length of a DAC 1104)+50 μs (e.g., the amount of time for transceiver 512 to stabilize)=118 μs. The amount of time for which device 202-x is awake to listen for DAC 1106 may be given by: 68 μs (e.g., the length of a DAC 1106)+50 μs (e.g., the amount of time for transceiver 512 to stabilize)=118 μs. The total amount of time for which device 202-x is awake in the frame may be given 118 μs+118 μs=236 μs. It may follow that:

$$\text{Duty cycle} = 236\ \mu s/1.28\ \text{seconds} = 0.018\%. \quad (1)$$

The total amount of time for which device 202-y is awake to receive and transmit a DAC may be given by 236 μs+drift time, where the drift time, which is also referred to as guard period, may be an amount of time by which a slave device may drift or vary in time with respect to a master device's signal. The drift time (DT) may be given by:

$$DT = T_{CYCLE} \cdot \gamma \quad (2),$$

where is γ the rate of the drift. Assuming the worst-case drift at γ=40 parts per million (ppm) (e.g., two times the maximum error or inaccuracy of individual devices, of 20 ppm in accordance with an exemplary scenario) and $T_{CYCLE}$=1.28 seconds, the DT may be determined as 51 μs. Since the DT can be either positive or negative, the DT may be symmetric around anchor point, as shown in FIG. 11. With these values, the duty cycle for device 202-y may be given by:

$$\text{Duty Cycle} = (236\ \mu s + 2 \cdot DT)/1.28\ \text{seconds} = 0.026\% \quad (3)$$

In process 800 described above, if multiple slave devices are being synchronized to a single master device, a communication link between the master device and a slave device may be separated from other communication links between the master device and other slaves devices (e.g., prevent interference), by time staggering a signal to the slave device relative to signals to the other slave devices. The time staggering may establish an anchor point for each slave device. Such a mechanism may be important in distinguishing signals in the links, as a single CAC may be used for the links.

Figure 11B:
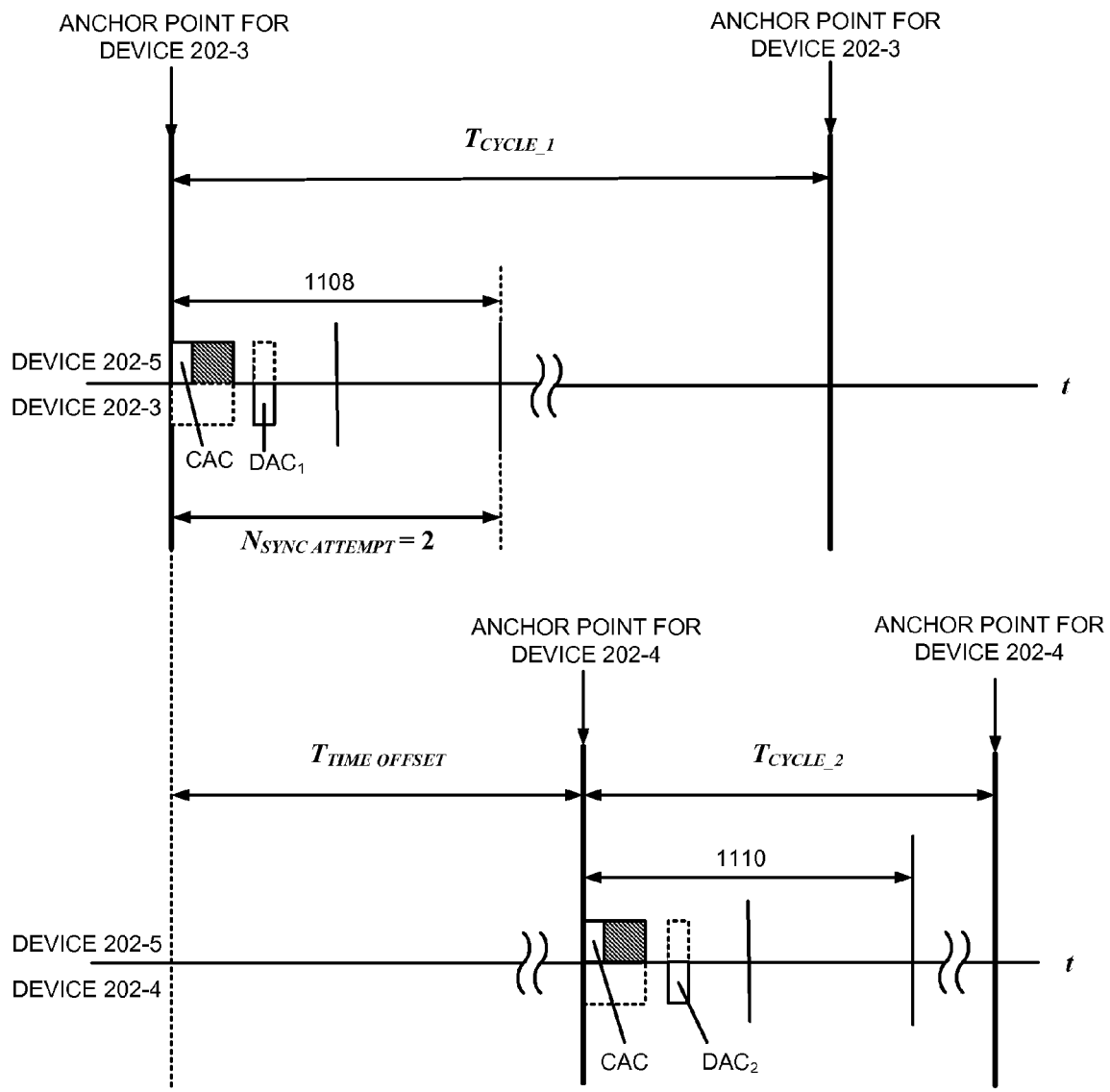
FIG. 11B shows timing diagrams signals of signals that are generated by devices of FIG. 2.

FIG. 11B shows staggering a signal from master device 202-5 to slave device 202-3 relative to a signal from master device 202-5 to slave device 202-4. As shown, device 202-3 and device 202-4 may have a power savings cycle duration of $T_{CYCLE\_1}$ and $T_{CYCLE\_2}$, respectively. In addition, device 202-3 may have anchor points that are distinct from anchor points of device 202-4. Initial time offset $T_{TIME\ OFFSET}$ may be larger than a time window that corresponds to $N_{SYNC\ ATTEMPT}$ frames.

In time interval 1108, master device 202-5 may communicate with slave device 202-3 by using $DAC_1$, which may be based on the BD-ADDR of slave device 202-3. In time interval 1110, master device 202-3 may communicate with slave device 202-4 by using $DAC_2$, which may be based on the BD-ADDR of slave device 202-4. $DAC_1$ and $DAC_2$ may be used for synchronization purposes and for indicating that no data is waiting to be transmitted. CAC, which is based on master device 202-5, may be used to indicate that data is waiting to be transmitted.

EXAMPLE

The following example illustrates processes involved in code keying in a power savings mode, with reference to FIGS. 12, 13A, 13B, and 13C. The example is consistent with exemplary process 800 described above with respect to FIG. 8.

Figure 12:
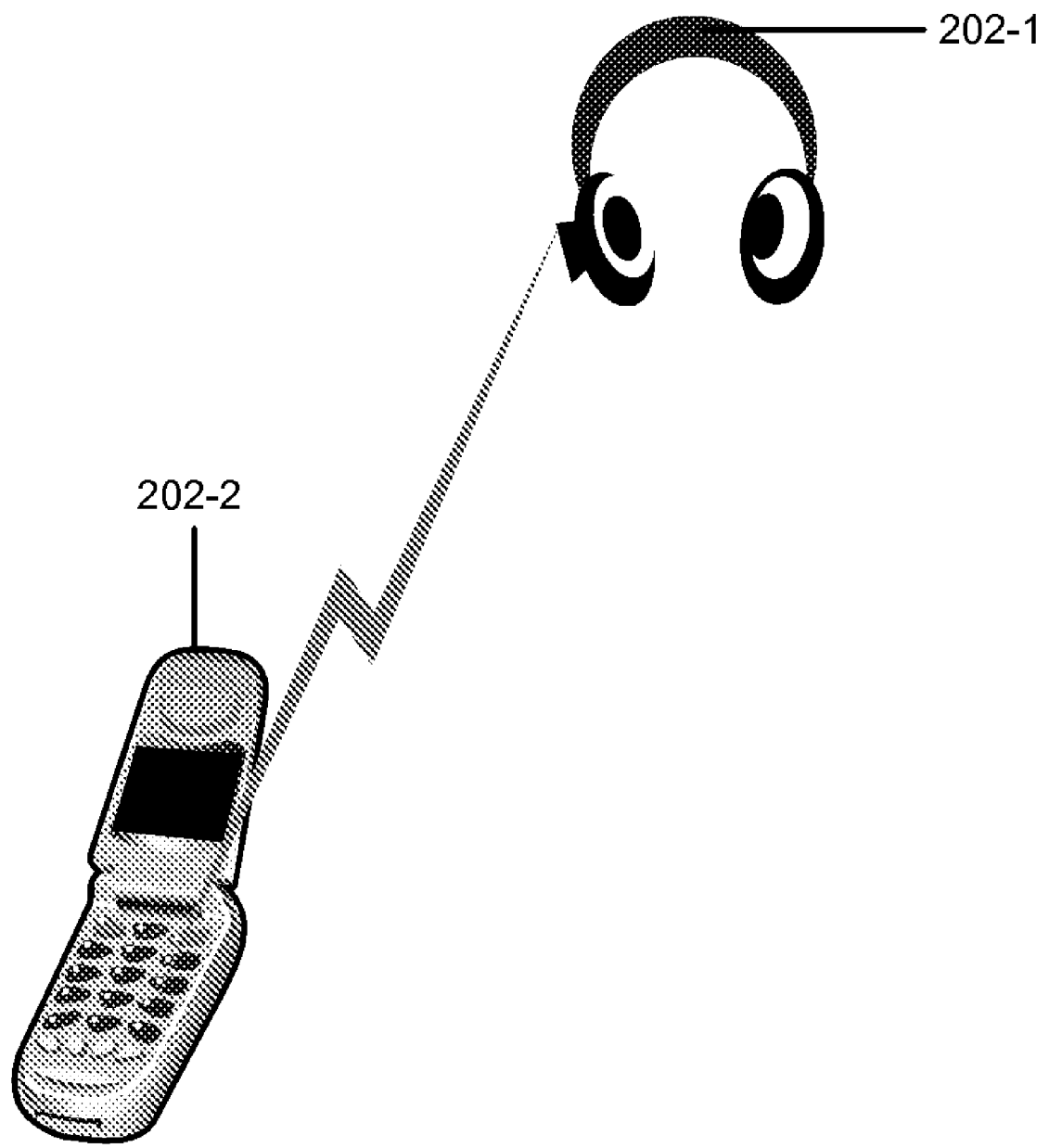
FIG. 12 illustrates exemplary devices of FIG. 2.

In the example, as illustrated in FIG. 12, assume that device 202-1 (e.g., a headset) has established a Bluetooth communication link with device 202-2 (e.g., a cell-phone). Some time after establishing the connection, device 202-2 negotiates an entry into the Sniff mode (e.g., a power savings mode for the Bluetooth communication).

Figure 13A:
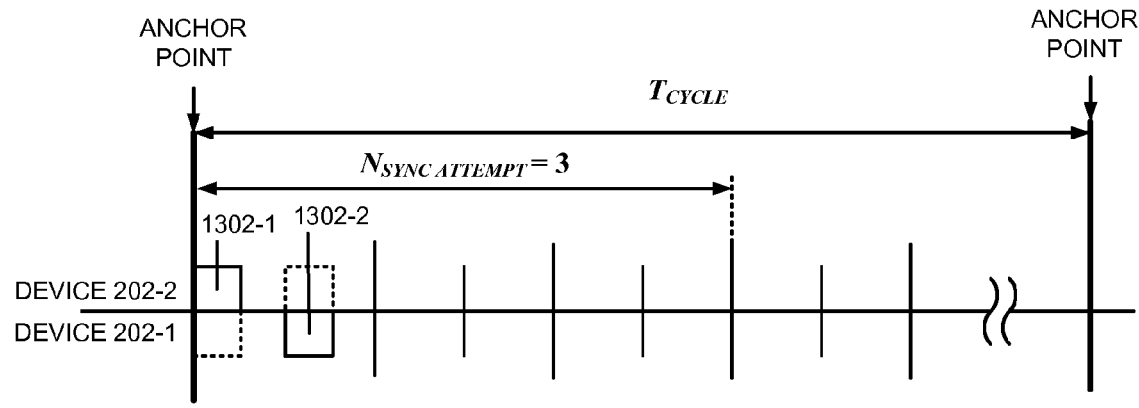
FIGS. 13A-13C show further timing diagrams of exemplary signals that are generated by the exemplary devices of FIG. 12.

FIG. 13A shows a timing diagram of exemplary signals that are generated by device 202-1 and device 202-2. As shown, each power savings cycle lasts $T_{CYCLE}$, and starts and ends at anchor points. Additionally, each power savings cycle includes $N_{SYNC\ ATTEMPT}$=3 frames.

Because device 202-2 is in the Sniff mode, device 202-2 sends a sync packet 1302-1 to device 202-1 within a transmit time slot. Device 202-2 enters a sleep mode, wakes up at the start of a receive time slot, receives a reply sync packet 1302-2, and returns to sleep. Device 202-1 listens for a packet in the transmit time slot, receives sync packet 1302-1, goes to sleep, wakes up at the start of the receive time slot, transmits reply sync packet 1302-2, and falls asleep. No data is waiting in either device 202-1 or device 202-1. Device 202-1 and device 202-1 sleep until the next anchor point.

Figure 13B:
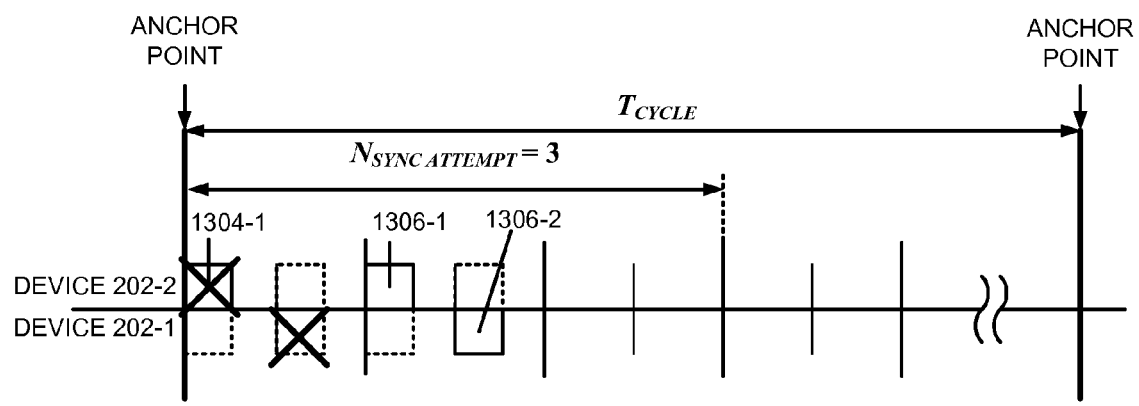

FIG. 13B shows a timing diagram of exemplary signals that are generated by devices 202-1 and device 202-2 when device 202-1 is unable to receive a sync packet 1304-1 from device 202-2. As shown, device 202-2 sends sync packet 1304-1, falls asleep, wakes up at the start of a receive time slot, does not receive a reply sync packet, and returns to sleep. Device 202-1 listens for a sync packet 1304-1 in the transmit time slot, does not detect the sync packet, and goes to sleep.

At the start of the next frame, device 202-2 sends another sync packet 1306-1 that is detected by device 202-1. After devices 202-1 and 202-2 transition through sleep-wake periods and succeed in receiving/sending a reply sync packet 1306-2, devices 202-1 and 202-2 sleep until the next anchor point is reached.

Figure 13C:
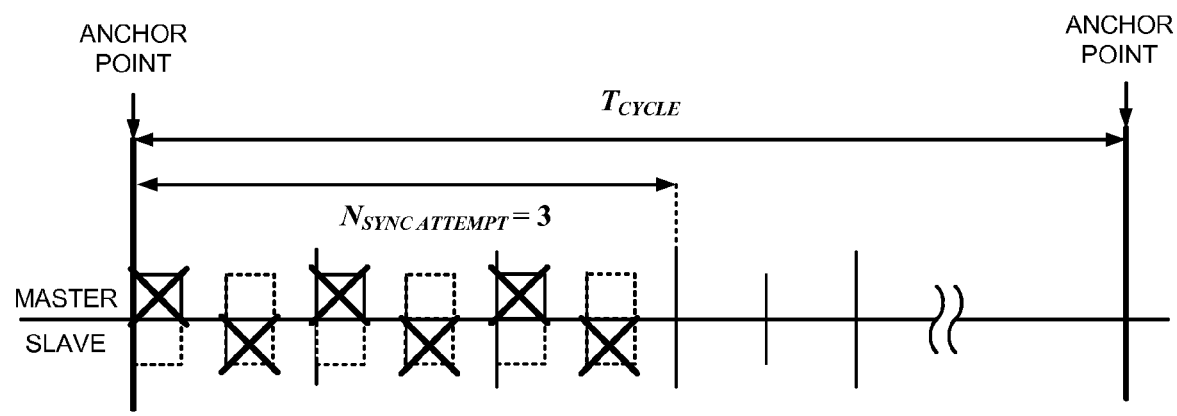

FIG. 13C shows a timing diagram of exemplary signals that are generated by devices 202-1 and device 202-2 when device 202-1 and 202-2 fail to exchange a sync packet and a replay sync packet within $N_{SYNC\ ATTEMPT}$=3 frames. As shown, device 202-2 sends a sync packet in a transmit slot within each of 3 frames in FIG. 13C. Through several sleep and awake periods, each of the sync packets fails to reach device 202-1. Eventually, both devices 202-1 and 202-2 sleep until the next anchor point is reached.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, while a series of blocks has been described with regard to an exemplary process illustrated in FIG. 8, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, a microprocessor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A device comprising:
   logic, implemented at least partially in hardware, the logic to:
   enter a power savings mode;
   transmit a first synchronization packet to a remote device within a first transmission time slot in a first power savings cycle, the first synchronization packet including one of a first code based on an address of the device or a second code based on an address of the remote device, where the first code is to indicate that the device has data to be sent to the remote device and the second code is to indicate that the device does not have data to be sent to the remote device;
   cause the device to sleep after transmitting the first synchronization packet to save energy;
   wake the device at a first receive time slot in the first power savings cycle;
   receive, at the device, a reply synchronization packet, the reply synchronization packet including one of the first code, or the second code, where the first code is to indicate that the remote device has data to be sent to the device and the second code is to indicate that the remote device does not have data to be sent to the device; and
   cause the device to sleep until a start of a second power savings cycle that follows the first power savings cycle to save energy.

2. The device of claim 1, where, when the first synchronization packet includes the second code, the first synchronization packet is only to provide a signal to synchronize the device and the remote device.

3. The device of claim 1, where, when the reply synchronization packet includes the first, the reply synchronization packet has data to transfer to the device.

4. The device of claim 1, where the logic is further to:
   send a second synchronization packet, in a second transmission time slot of the first power savings cycle that follows the first transmission time slot, when a reply synchronization packet is not received in the first receive time slot.

5. The device of claim 1, where the first synchronization packet includes a device access code based on the address of the remote device.

6. The device of claim 5, where the device access code includes:
   a Bluetooth device address of the remote device.

7. The device of claim 1, where the first synchronization packet includes:
   a header;
   data; and
   a channel access code to indicate that the first synchronization packet includes the data to be sent to the remote device.

8. The device of claim 1, where the logic is further to:
   send a second synchronization packet that includes a device access code, based on the address of the remote device, to indicate that no additional data is waiting to be transmitted from the device.

9. The device of claim 1, where the logic is further to:
   receive a second reply synchronization packet that includes one of:
   the first code to indicate that additional data is waiting to be transmitted from the remote device; or
   the second code to indicate that no additional data is waiting to be transmitted from the remote device.

10. The device of claim 1, where the logic is further to:
    send a second synchronization packet that includes one of:
    the first code to indicate that additional data is waiting to be transmitted from the device, or
    the second code to indicate that no additional data is waiting to be transmitted from the device.

11. The device of claim 10, where the logic is further to:
    receive a second reply synchronization packet that includes one of:
    the first code to indicate that additional data is waiting to be transmitted from the remote device; or
    the second code to indicate that no additional data is waiting to be transmitted from the remote device.

12. The device of claim 1, where the logic is further to:
    transmit a second synchronization packet to a second remote device in a power savings cycle of the second remote device.

13. The device of claim 12, where the power savings cycle of the second remote device includes an anchor point that is offset from an anchor point of the first power savings cycle by at least a predetermined number of synchronization attempts.

14. The device of claim 1, where the logic is further to:
    provide additional power to components of the logic for a particular amount of time prior to an arrival of the first receive time slot to enable the components to receive the reply synchronization packet.

15. The device of claim 1, where the logic is further to:
    compensate for a clock drift in the logic when the logic listens for a second synchronization packet from a master device.

16. The device of claim 1, where the logic is further to:
implement a code correlator that detects one of a device access code or a channel access code in the reply synchronization packet.

17. The device of claim 1, where the logic includes:
a Bluetooth controller.

18. The device of claim 1, where the power savings mode is implemented a Bluetooth sniff mode.

19. The device of claim 1, where the device comprises:
a cell-phone;
a lap-top; or
a wireless computer peripheral.

20. A method comprising:
synchronizing a master device with a slave device in at least one of a plurality of time frames, the synchronizing including:
sending a synchronization packet within a transmit time slot in one of the time frames, the synchronization packet including one of a first code based on an address of the master device or a second code based on an address of the slave device, where the first code is to indicate that the master device has data to be sent to the slave device and the second code is to indicate that the master device does not have data to be sent to the slave device;
operating at least one of the master device or the slave device in a reduced power consumption state until a start of a receive time slot associated with the one of the time frames;
determining whether a reply packet is received within the receive time slot, the reply packet including one of the first code or the second code, where the first code is to indicate that the slave device has data to be sent to the master device and the second code is to indicate that the slave device does not have data to be sent to the master device; and
processing user data that is to be sent to or to be received from the slave device if the reply packet is received within the receive time slot.

21. The method of claim 20, further comprising:
determining if the one of the time frames is a last time frame of a power savings cycle when the reply packet is not received within the receive time slot.

22. The method of claim 21, further comprising:
operating in the reduced power consumption state until a next time frame arrives when the one of the time frames is the last time frame of the power savings cycle.

23. The method of claim 20, further comprising:
entering a sniff mode; or
exiting a sniff mode.

24. A device comprising:
logic, implemented at least partially in hardware, the logic to:
receive a first synchronization packet from a remote device within a first receive time slot in a first power savings cycle, the first synchronization packet including one of a first code based on an address of the device or a second code based on the address of the remote device, where the first code is to indicate that the remote device has data to be sent to the device and the second code is to indicate that the remote device does not have data to be sent to the device;
cause the remote device to sleep after receiving the first synchronization packet to save energy;
wake the remote device at a first transmission time slot in the first power savings cycle;
transmit a reply synchronization packet to the remote device, the reply synchronization packet including one of the first code or the second code, where the first code is to indicate that the device has data to be sent to the remote device and the second code is to indicate that the device does not have data to be sent to the remote device that; and
cause the remote device to sleep until a start of a second power savings cycle that follows the first power savings cycle to save energy.

* * * * *

UNITED STATES PATENT AND TRADEMARK OFFICE
CERTIFICATE OF CORRECTION

| | | |
|---|---|---|
| PATENT NO. | : 8,018,885 B2 | |
| APPLICATION NO. | : 12/025090 | |
| DATED | : September 13, 2011 | |
| INVENTOR(S) | : Jacobus Cornelis Haartsen | |

It is certified that error appears in the above-identified patent and that said Letters Patent is hereby corrected as shown below:

Column 16, line 34, remove the word "that."

Signed and Sealed this
Eighth Day of November, 2011

David J. Kappos
*Director of the United States Patent and Trademark Office*